(12) United States Patent
Sato et al.

(10) Patent No.: US 6,495,194 B2
(45) Date of Patent: *Dec. 17, 2002

(54) PROCESSED WHEY PROTEIN AND PROCESS FOR MANUFACTURING THE SAME

(75) Inventors: Kaoru Sato, Kamifukuoka (JP); Hiroshi Imai, Kawagoe (JP); Masakazu Horikawa, Sapporo (JP); Masami Kawanari, Kawagoe (JP)

(73) Assignee: Snow Brand Milk Products Co., Ltd., Hokkaido (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/809,637

(22) PCT Filed: Dec. 13, 1995

(86) PCT No.: PCT/JP95/02553

§ 371 (c)(1), (2), (4) Date: Mar. 26, 1997

(87) PCT Pub. No.: WO97/05784

PCT Pub. Date: Feb. 20, 1997

(65) Prior Publication Data

US 2002/0031600 A1 Mar. 14, 2002

(30) Foreign Application Priority Data

Aug. 8, 1995 (JP) .............................. 7-222664

(51) Int. Cl.⁷ ........................... A23J 1/02; A23C 17/00; A23C 9/16
(52) U.S. Cl. ........................ 426/657; 426/656; 426/583; 426/588
(58) Field of Search ............... 426/330.2, 580, 426/443, 657, 656, 583, 588

(56) References Cited

U.S. PATENT DOCUMENTS

| | | | |
|---|---|---|---|
| 4,271,201 A | | 6/1981 | Stenne ........................ 426/40 |
| 4,361,588 A | * | 11/1982 | Herz ........................ 426/104 |
| 4,519,945 A | * | 5/1985 | Ottenhof ..................... 260/119 |
| 4,675,201 A | * | 6/1987 | Lee et al. .................... 426/573 |
| 4,879,131 A | * | 11/1989 | De Rahm .................... 426/583 |
| 4,973,488 A | | 11/1990 | Ernster ........................ 426/580 |
| 5,039,532 A | | 8/1991 | Jost et al. ..................... 426/41 |
| 5,217,741 A | * | 6/1993 | Kawachi et al. ............. 426/573 |
| 5,223,299 A | | 6/1993 | Dalan et al. ................. 426/587 |
| 5,350,590 A | * | 9/1994 | McCarthy et al. .......... 426/549 |
| 5,413,804 A | | 5/1995 | Rhodes ........................ 426/583 |
| 5,494,696 A | * | 2/1996 | Holst et al. .................. 426/583 |
| 5,902,630 A | | 5/1999 | Imai et al. ................... 426/657 |

FOREIGN PATENT DOCUMENTS

| | | | |
|---|---|---|---|
| CA | 1031622 | 5/1978 | ...................... 99/57 |
| EP | 0162498 | 11/1985 | ............ A23C/19/05 |
| GB | 2 079 287 A | 1/1982 | .............. A23L/1/16 |
| JP | 05 064550 A | 3/1993 | |
| JP | 05 260898 A | 10/1993 | .............. A23J/3/08 |

OTHER PUBLICATIONS

D.G. Dalgleish, "Denaturation and Aggregation of Serum Proteins and Caseins in Heated Milk" *J. of Agric. Food Chem.* 38(11):1995–1999 (1990).
K. Hashizume et al., "Gel–Forming Characteristics of Milk Proteins. 1. Effect of Heat Treatment" *J. of Diary Sci.* 71(4):1439–1446 (1988).
A.J.R. Law et al., "Heat–Induced Changes in the Whey Proteins and Caseins" *Milchwissenschaft Milk Science International* 49(1):125–129 (1994).
M. Paulsson et al., "Thermal Denaturation of Whey Proteins in Mixtures with Caseins Studied by Differential Scanning Calorimetry" *J. of Diary Sci.* 73(1):591–600 (1990).
J. Plock et al., "Whey Protein Denaturation in Milk Protein Solutions Dependent on the Casein/Whey Protein Ratio and Its Influence on Gelation" *Protein Interactions*, Hans Visser, ed., Developed from the Symposium on Protein Interactions Held at the 201st Annual Meeting of the American Chemical Society, Atlanta, GA, Apr. 15–17, 1991, pp. 168–191.
E.M. Stevenson et al., "Heat–Induced Aggregation of Whey Proteins Is Enhanced by Addition of Thiolated β–Casein" *J. Agric. Food Chem.* 44:2825–2828 (1996).

* cited by examiner

*Primary Examiner*—Curtis E. Sherrer
(74) *Attorney, Agent, or Firm*—Testa, Hurwitz & Thibeault, LLP

(57) ABSTRACT

A processed whey protein with an improved shelf life comprising partially heat-denatured whey protein and casein protein is provided. The partially heat-denatured whey protein can be prepared by heating a solution with a protein concentration of 0.5 to 15% by weight and pH 6–8 at 55 to 120° C. for 1 to 120 minutes. A process for the preparation of processed whey protein is also provided and comprises adding casein protein to partially heat-denatured whey protein, or adding casein protein to non-denatured whey protein and heating the mixture to partially denature the non-denatured whey protein. The processed whey protein has an improved shelf life. The gel obtained from the processed whey protein exhibits high water retention capacity and superior elasticity. The product is useful as a raw material of foods.

5 Claims, 1 Drawing Sheet

US 6,495,194 B2

PROCESSED WHEY PROTEIN AND PROCESS FOR MANUFACTURING THE SAME

REFERENCE TO RELATED APPLICATIONS

This application claims priority to PCT/JP95/02553, filed Dec. 13, 1995, which claims priority to Japanese Patent Application No. 222644, filed Aug. 8, 1995, the disclosures of which are incorporated by reference herein.

FIELD OF THE INVENTION

The present invention relates to a processed whey protein and a process for manufacturing the processed whey protein. The processed whey protein of the present invention is useful as a food material for manufacturing foods requiring such properties as gelling capability, water retention capacity, and high viscosity.

BACKGROUND OF THE INVENTION

Whey proteins have conventionally been used as foodstuffs because of their high nutritional value and have also been widely used as supplemental materials for foods such as binders, extenders, and water retention agents, wherein the properties of the whey protein such as emulsifying property, foaming property, and gelation are utilized. Among these, the high gelation makes the whey protein an advantageous texture modifier for raw meat and fish meat products. Thus, the gelation of whey proteins is one important factor that improves the texture and water retention capacity of foods. Generally, proteins are denatured by heat and create mutual interactions such as a hydrophobic interaction between the protein molecules' non-covalent bonds, such as ionic bonds and hydrogen bonds and an SH/SS exchange reaction whereas whey proteins are denatured and gelated by heat at temperatures of 60° C. or higher. However, because the whey protein gel thus obtained is generally nontransparent and has only a small water retention capacity and a brittle structure, such a whey protein gel is not preferably used as a food material.

For these reasons, in order to improve the gel structure of whey proteins, a partially heat-denatured whey protein solution produced by partially denaturing the whey protein by heating, or a solution obtained by drying this partially heat-denatured whey protein solution to produce a dried powder and re-dissolving the dried powder, is used to obtain a whey protein gel which has high water-retention capacity and excellent texture. Specifically, a highly elastic gel with a high water retention capacity can be obtained by producing a solution of the partially heat-denatured whey protein at a concentration of 4–15% by weight, preferably 5–12% by weight and heating this solution at 55° C. to 120° C., preferably 65° C. to 95° C., or producing a solution by drying this solution and re-dissolving the resulting dried powder, and then by adding a salt at low temperatures to these solutions (Japanese Published Unexamined Patent Application No. 64550/1993), by acidifying these solutions (Japanese Published Unexamined Patent Application No. 124067/1990), or by freeze-drying and thawing these solutions (Japanese Published Unexamined Patent Applications No. 280834/1991 and 27249/1991). Whey proteins which are usually spherical produce a soluble aggregate in which protein molecules are aggregated like chains, if partially denatured by heating. This soluble aggregate in which protein molecules of the whey protein are aggregated like chains are hereinafter referred to as "soluble aggregate". Although the whey protein does not gel in the soluble aggregate, this soluble aggregate of whey protein forms a three dimensional network and produces irreversible gel if the above-mentioned measures are taken. The whey protein gel thus obtained has a high water-retention capacity, superior elasticity, and a smooth constitution.

This soluble aggregate of whey protein can also be produced by preparing a whey protein solution with a concentration at which gelling does not occur by heating, and treating this solution with heat at 55° C. to 120° C. and for 1 to 120 minutes. This soluble aggregate of whey protein is referred to as "partially heat-denatured whey protein" in the present invention.

The gel produced from the solution of the partially heat-denatured whey protein which has been obtained by partially denatured whey protein with heat has a good constitution. However, a solution of the partially heat-denatured whey protein tends to change its form into a sol-like material due to an increase in its viscosity during storage for a long period of time, because the whey protein which has been partially denatured and is present as a soluble aggregate readily reacts with a small amount of a salt in the solution.

SUMMARY OF THE INVENTION

The inventors of the present invention have undertaken extensive studies to improve the shelf life of the solution of the above-mentioned partially heat-denatured whey protein. As a result, the inventors have found that if a casein protein is added to a solution of a partially heat-denatured whey protein wherein whey proteins are in the form of a soluble aggregate, the shelf life of the partially heat-denatured whey protein solution is improved, and a gel obtained from this whey protein exhibits a high water-retention capacity, excellent elasticity, and smooth constitution even if the solution of partially heat-denatured whey protein is stored for a long period of time. These findings have led to the completion of the present invention. Accordingly, an object of the present invention is to provide a processed whey protein with improved shelf life, which is capable of producing a gel exhibiting a high water-retention capacity, excellent elasticity, and smooth constitution, and to provide a process for manufacturing such a processed whey protein.

DETAILED DESCRIPTION OF THE INVENTION

Figure 1:
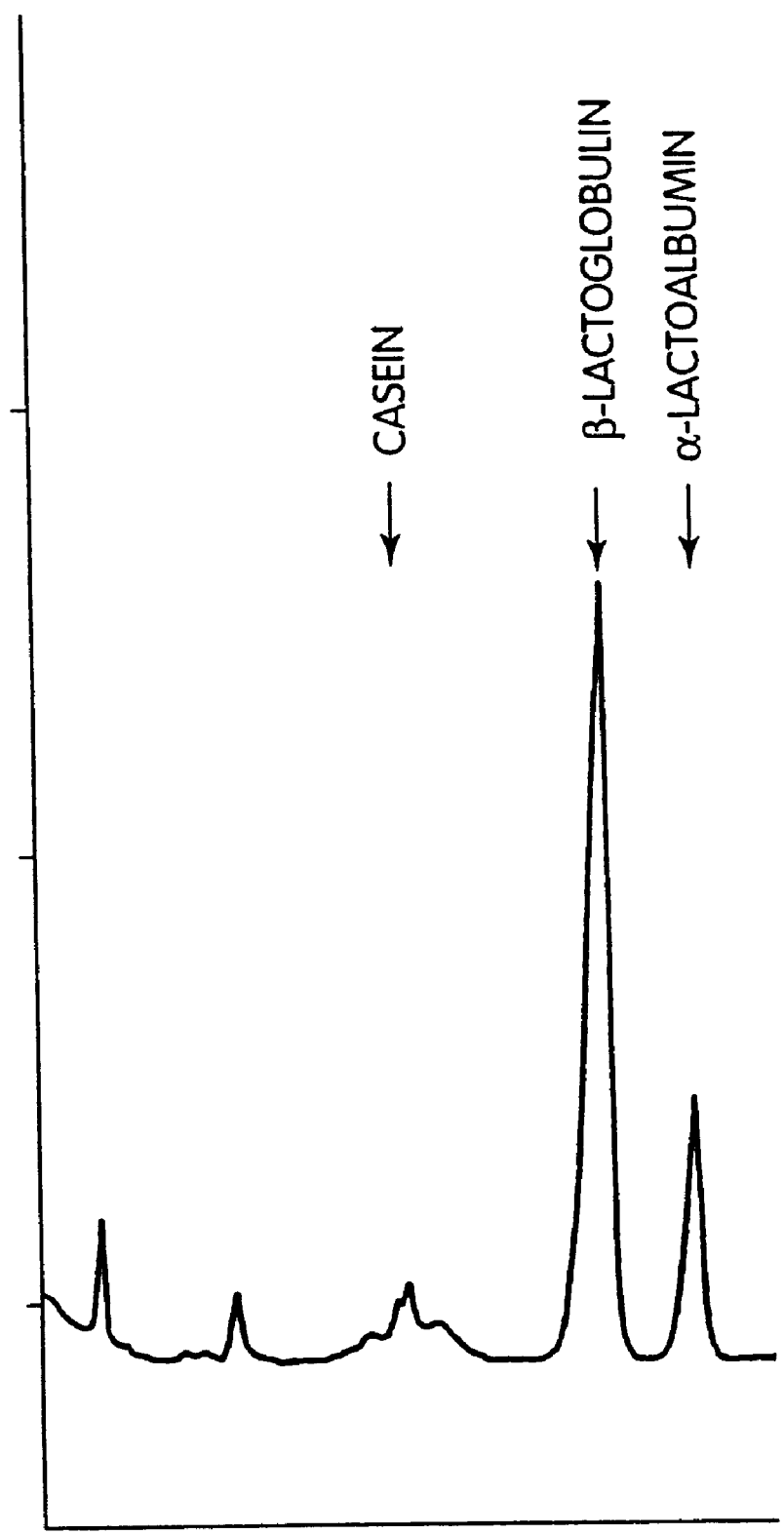
FIG. 1 is a chromatographic scan of an electrophoresis pattern of the processed whey protein obtained in Example 2 (Invention Product 6).

The present invention has been achieved to solve these problems and relates to a processed whey protein with improved shelf life comprising a partially heat-denatured protein and a casein protein and to provide a process for manufacturing the same. This processed whey protein can be prepared by adding a casein protein to a solution of a non-denatured whey protein and heating the solution to partially heat-denature the whey protein, or by producing a partially heat-denatured whey protein by heating a solution of a non-denatured whey protein and adding a casein protein to this partially heat-denatured whey protein solution. In the present invention, it is possible to add a non-denatured whey protein together with a casein protein. Furthermore, the solution of the processed whey protein may be dried and made into a powder, and the powder may be molded into any optional shape. More specifically, the processed whey protein of the present invention can be obtained as a solution by a process comprising preparing a whey protein solution with a concentration of 15% or lower, a concentration range wherein the whey protein does not aggregate when heated at a temperature higher than the heat-denaturing temperature of the whey protein, i.e. 55° C. or higher, adding a casein protein to this solution, and heating the resulting solution at a heat denaturing temperature of the whey protein, i.e., at 55° C.–120° C. Alternatively, it is possible to prepare the whey protein solution with a concentration of 15% or lower, a concentration range wherein the whey protein does not aggregate when heated at a temperature higher than the heat-denaturing temperature of the whey protein, i.e. 55° C. or higher, heat this solution at a heat denaturing temperature of the whey protein, i.e., at 55° C. –120° C. and then add a casein protein to the resulting solution. The solution of the processed whey protein may be dried and made into a powder by a conventional method, and the powder may be molded with any optional means.

A whey protein solution is commonly known to aggregate by heating to produce a brittle gel, when the concentration is higher than 15%. To prevent such a gel formation, a solution of whey protein at a concentration of 15% or less, more preferably 12% or less, is heated to a temperature of 55° C. to 120° C., and more preferably to 65° C. to 95° C. This treatment causes the whey protein to be partially heat-denatured and causes a hydrophobic part to appear on the surface of the whey protein molecules which are spherical. Although this whey protein solution changes its properties depending on the degree of hydrohobocity of the whey protein, the target partially heat-denatured whey protein solution wherein the whey protein has been denatured to a soluble aggregate can be obtained by heating the solution with a concentration mentioned above and adjusted to pH 6–8 for 1 to 120 minutes. This partially heat-denatured whey protein solution can be prepared according to the method disclosed in Japanese Published Unexamined Patent Application No.64550/1993.

When a whey protein solution is heated at a concentration which does not cause the whey protein to aggregate, the whey protein reaches a certain denatured state, whereby the SH/SS exchange reaction occurs. At the same time, its hydrophobic characteristics are increased. As a result, the molecules of whey protein are inter-associated and form a soluble aggregate. A feature of the present invention resides in improving the shelf life of partially heat-denatured whey protein by adding a casein protein to a solution containing this soluble aggregate of whey protein, i.e. a solution of partially heat-denatured whey protein.

The processed whey protein solution in the present invention is prepared as follows. First, a non-denatured whey protein aqueous solution with a whey protein concentration of 0.5 to 15%, preferably 5 to 12%, is prepared. If the concentration of whey protein in the non-denatured whey protein solution is less than 0.5%, the gelation is only insufficiently achieved when the gel is produced from the resulting processed whey protein. If the concentration of non-denatured whey protein is more than 15%, the solution becomes highly viscus during heating, so that a part or all of the whey protein forms a gel.

The non-denatured whey protein solution is adjusted to pH 6–8. If the pH is less than 6, the whey protein aggregates and precipitates during heating, so that whey protein gel with a smooth constitution is formed only with difficulty. If the pH is more than 8, the taste of the whey protein obtained is poor. Moreover, it is desirable that the whey protein solution contain a salt-derived ion at a concentration of 0.5% or less, preferably 0.3% or less, and particularly preferably 0.01% or less. If the concentration of the salt-derived ion is more than 0.5%, the whey protein aggregates and precipitates, or gels during heating.

The processed whey protein of the present invention can be obtained by adding a casein protein to the non-denatured whey protein solution thus prepared and heating the solution to partially denature the whey protein, or by heating the non-denatured whey protein solution prepared above to partially denature the whey protein and adding a casein protein to the resulting solution. The temperature for the heat treatment is preferably 55° C. to 120° C., which is a temperature range sufficient to denature the non-denatured whey protein. The more preferable temperature range is 65° C. to.95° C. The solution is heated at these temperatures preferably for 1 to 120 minutes, and more preferably for 1 to 60 minutes. If the heating time is too short, the whey protein cannot be denatured and the degree of the hydrophobic property (hydrophobicity, FI/mg-protein) which is hereinafter defined is decreased. If the heating time is extended beyond the above period, on the other hand, there is no added improvement in the shelf-life of the processed whey protein gel.

The degree of heat denaturation of the processed whey protein can be numerically evaluated by measuring the hydrophobicity. The hydrophobicity (FI/mg-protein) of whey protein is normally 50 FI/mg-protein or more, and preferably 100 FI/mg-protein or more. A whey protein gel with a good constitution cannot be obtained if the hydrophobicity is less than 50 FI/mg-protein.

The hydrophobicity is expressed by the fluorescence intensity (FI) divided by the weight of whey protein (mg), wherein the fluorescence intensity is determined by diluting a whey protein solution to a concentration of 0.1 to 0.3 g protein/l, adding 8 mM of 1-anilinonaphthalene-8-sulfonic acid to the solution as a fluorescent probe, and measuring the fluorescence intensity at an exciting wavelength of 370 nm and a fluorescent wavelength of 470 nm using a fluorescent spectrophotometer. This method for the measurement of the degree of heat denaturation can be carried out according to the description in Japanese Published Unexamined Patent Application No. 64550/1993.

Next, a casein protein is added to a partially heat-denatured whey protein solution obtained according to the method described above. The amount of the casein whey protein to be added is 0.001 to 0.2 part by weight, preferably 0.005 to 0.1 part by weight, for 1 part by weight of the whey protein. Given as examples of the casein to be added are acid casein, rennet casein, sodium caseinate, potassium caseinate, magnesium caseinate, decomposition products of these caseins, casein micelles, and casein sub-micelles. The decomposition products of casein are the products obtained by decomposing a casein into a compound having a molecular weight of 1,000 or less. Either enzyme decomposition products or acid decomposition products can be used.

In addition, according to the present invention a solution of processed whey protein with improved shelf life can be obtained by adding a casein protein to a solution of a non-denatured whey protein and heating this solution to partially denature the whey protein, or by adding a casein protein to a solution of partially heat-denature whey protein, which has been obtained by heating a whey protein solution, and adding a non-denatured whey protein to the resulting solution.

The whey protein used in the present invention includes a cheese whey protein which is obtained as a by-product in a cheese manufacturing process, an acid whey protein produced by removing casein from milk by adding an acid, a whey protein produced by removing minerals and lactose from these whey proteins, and an isolated whey protein produced by recovering only precipitated whey protein fractions by adding ethanol. All of these can be prepared from milk and contain proteins such as α-lactoalbumin and β-lactoglobulin. Among these whey proteins, particularly preferred are whey protein concentrate (WPC), whey protein isolate (WPI), and the like. The whey protein gels obtained from the WPC or WPI have a rigid, elastic, and smooth constitution.

When a casein protein is to be added previously to the whey protein before the partially heat-denaturing is carried out, the casein protein is added to an aqueous solution of the whey protein, and the mixture is blended to dissolution, following which the solution is heated to denature the whey protein.

The processed whey protein of the present invention obtained by the above-described process form a gel if a salt is added with heating or if heated after the addition of a salt. In addition, the processed whey protein stored for a long period of time can also produce a gel with a high water retention capacity, superior elasticity, and smooth constitution.

The present invention will now be described in more detail by way of examples.

Exemplification

EXAMPLE 1

800 g of a commercially available whey protein concentrate (WPC Alacen 132™, protein content; 78.4%, ash content; 4.18%, pH 6.9) was dissolved in 9200 g of deionized water to produce a 8% WPC solution (protein concentration; 6.27%). This WPC solution was divided into five equal portions of 500 g each. Sodium caseinate (Sunlacto S-3™, a product of Taiyo Kagaku Co., Ltd.) or magnesium caseinate (a product of DMV Co.) were added with stirring in an amount such that the content of the casein protein is 0.001, 0.05, or 0.2 part by weight for 1 part by weight of whey protein. The mixtures were heated over a hot water bath while stirring to 78° C., at which temperature the mixtures were held for 30 minutes. Then, the mixtures were cooled to 5° C. with ice water to obtain solutions (hereinafter designated as Invention Products 1–4). A solution without the addition of a casein protein was used as a Control Sample. The solutions thus prepared were stored at 5° C. for 3 weeks.

Table 1 shows the amount of casein protein added for one part by weight of whey protein and the hydrophobicity of the solutions.

TABLE 1

|  | Casein protein Amount (part by weight) | Hydrophobicity (FI/mg-protein) |
|---|---|---|
| Control Sample | — | 102 |
| Na-caseinate | | |
| Invention Product 1 | 0.001 | 104 |
| Invention Product 2 | 0.15 | 103 |
| Invention Product 3 | 0.2 | 95 |

TABLE 1-continued

|  | Casein protein Amount (part by weight) | Hydrophobicity (FI/mg-protein) |
|---|---|---|
| Mg-caseinate | | |
| Invention Product 4 | 0.05 | 102 |

The properties of the solutions in the Invention Products 1 to 4 which were prepared in Example 1 and the Control Sample were confirmed immediately after preparation, one week, two weeks, and three weeks after the preparation.

Next, gels were prepared from the Invention Products 1–4 and the Control Sample. Sodium chloride was added to the Invention Products 1–4 and the Control Sample to a concentration of 1.2% and the solutions were filled into cylindrical cells (diameter; 25 mm, height; 15 mm) and allowed to stand for 24 hours at 20° C., thereby obtaining gels. The gel strengths were measured using a Creep-Meter RE-33005™ (a product of Yamaden Co., Ltd.) with a circular disk plunger (diameter; 50 mm) at a compressibility ratio of 67% and a compression rate of 1 mm/sec. The gel strength (g) was expressed by the load at the maximum compression at 20° C.

Changes in the properties of the solutions during storage and the results of the gel strength measurement are shown in Table 2.

TABLE 2

|  |  | Immediately after preparation | After 1 week | After 2 weeks | After 3 weeks |
|---|---|---|---|---|---|
| Control Sample | Property of solution | Liquid | Liquid | Sol | Sol |
|  | Gel strength (g) | 1500 | 1450 | <500 | <500 |
| Invention Product 1 | Property of solution | Liquid | Liquid | Liquid | Liquid |
|  | Gel strength (g) | 1550 | 1560 | 1510 | 1510 |
| Invention Product 2 | Property of solution | Liquid | Liquid | Liquid | Liquid |
|  | Gel strength (g) | 1530 | 1520 | 1535 | 1490 |
| Invention Product 3 | Property of solution | Liquid | Liquid | Liquid | Liquid |
|  | Gel strength (g) | 1310 | 1290 | 1280 | 1300 |
| Invention Product 4 | Property of solution | Liquid | Liquid | Liquid | Liquid |
|  | Gel strength (g) | 1580 | 1580 | 1560 | 1530 |

All Invention Products 1–4 and the Control Sample were liquid immediately after the preparation. The viscosity of the Control Sample gradually increased during storage, and this sample became a highly viscous sol after two weeks. In contrast, the Invention Products 1–4 remained liquid after storage of three weeks with almost no increase in the viscosity.

With regard to the gel strength, all samples, the Invention Products 1–4 and the Control Sample, formed a solid gel from solutions immediately after preparation. After three weeks of storage, the Invention Products 1–4 exhibited almost no change in the gel strength as compared with that of immediately after the preparation, and the gels were solid. In contrast, the solution of the Control Sample partly gelled during storage. No homogeneous gel was obtained even if a salt was added.

The above results indicate that a solution of processed whey protein obtained by the addition of a casein protein to a partially heat-denatured whey protein exhibits an improved shelf life and that the gel obtained from such a solution of processed whey protein exhibits no decrease in the gel strength even if the solution has been stored for a long period.

EXAMPLE 2

600 g of a commercially available whey protein isolate (WPI, a product of Protose Separation Co., protein content 78.4%, ash content 4.18%) was dissolved in 9400 g of de-ionized water to produce a 6% WPI solution (protein concentration 4.70%, pH 6.8). This WPI solution was heated in a hot water bath with stirring and held at 75° C. for 20 minutes to obtain a partially heat-denatured WPI solution. The solution was cooled with ice water to 5° C. Then, the total 10 kg of the partially heat-denatured WPI solution was divided into five equal portions of 2 kg each. Sodium caseinate (Sunlacto S-3™, a product of Taiyo Kagaku Co., Ltd.) or magnesium caseinate (a product of DMV Co.) were added with stirring in an amount such that the content of the casein protein is 0.001, 0.05, or 0.2 part by weight for 1 part by weight of whey protein, thereby producing the products of the present invention (hereinafter designated as Invention Products 5–8). A solution without the addition of a casein protein was used as a Control Sample. Table 3 shows the amount of casein protein added for one part by weight of whey protein and the hydrophobicity of the solutions.

The solutions thus prepared were stored at 5° C. for 3 weeks.

TABLE 3

|  | Casein protein Amount (part by weight) | Hydrophobicity (FI/mg-protein) |
|---|---|---|
| Control Sample | — | 102 |
|  | Na-caseinate |  |
| Invention Product 5 | 0.001 | 104 |
| Invention Product 6 | 0.05 | 103 |
| Invention Product 7 | 0.2 | 95 |
|  | Mg-caseinate |  |
| Invention Product 8 | 0.05 | 102 |

The properties of the solutions in the Invention Products 5 to 8 which were prepared in Example 2 and the Control Sample were confirmed immediately after preparation, one week, two weeks, and three weeks after the preparation.

Next, gels were prepared from the Invention Products 5–8 and the Control Sample. 6 g (1.2%) of sodium chloride was added to the Invention Products 5–8 and the Control Sample at room temperature and the solutions were filled into cylindrical cells (diameter 25 mm, height 15 mm) and allowed to stand for 24 hours at 20° C., thereby obtaining gels. The gel strengths were measured using a Creep-Meter RE-33005™ (a product of Yamaden Co., Ltd.) with a circular disk plunger (diameter 50 mm) at a compressibility ratio of 67% and a compression rate of 1 mm/sec. The gel strength (g) was expressed by the load at the maximum compression at 20° C.

Changes in the properties of the solutions and the results of the gel strength measurement are shown in Table 4.

TABLE 4

|  |  | Immediately after preparation | After 1 week | After 2 weeks | After 3 weeks |
|---|---|---|---|---|---|
| Control Sample | Property of solution | Liquid | Liquid | Sol | Sol |
| Invention Product 5 | Gel strength (g) | 1600 | 1520 | <500 | <500 |
|  | Property of solution | Liquid | Liquid | Liquid | Liquid |
| Invention Product 6 | Gel strength (g) | 1610 | 1650 | 1580 | 1580 |
|  | Property of solution | Liquid | Liquid | Liquid | Liquid |
| Invention Product 7 | Gel strength (g) | 1580 | 1550 | 1570 | 1550 |
|  | Property of solution | Liquid | Liquid | Liquid | Liquid |
| Invention Product 8 | Gel strength (g) | 1460 | 1510 | 1500 | 1480 |
|  | Property of solution | Liquid | Liquid | Liquid | Liquid |
|  | Gel strength (g) | 1620 | 1640 | 1610 | 1620 |

All Invention Products 5–8 and the Control Sample were liquid immediately after the preparation. The viscosity of the Control Sample gradually increased during storage, and this sample became a highly viscous sol after two weeks. In contrast, the Invention Products 5–8 remained liquid after storage of three weeks with almost no increase in the viscosity.

With regard to the gel strength, all samples, the Invention Products 5–8 and the Control Sample, formed solid gels from solutions immediately after preparation. After three weeks of storage, the Invention Products 5–8 exhibited almost no change in the gel strength as compared with that of immediately after the preparation, and the gels were solid. In contrast, the solution of the Control Sample partly gelled during storage. No homogeneous gel was obtained even if a salt was added.

The above results indicate that a solution of the processed whey protein obtained by the addition of a casein protein to a partially heat-denatured whey protein exhibits an improved shelf life and that the gel obtained from such a solution of processed whey protein exhibits no decrease in the gel strength even if the solution has been stored for a long period.

EXAMPLE 3

7 kg of a whey protein isolate (WPI, Protose Separation Co., protein content 89.5%, ash content 2.3%) and 350 g of sodium caseinate were dissolved in 93 kg of deionized water to produce a 7.3% WPI solution (protein concentration 6.5%, pH 6.90). This WPI solution was heated to 90° C. in a hot water bath with stirring and held at this temperature for 15 minutes to obtain a partially heat-denatured WPI solution. Then, the total 100 kg of the solution was cooled to 50° C., and to 50 kg of the solution was added 3.5 kg of WPI powder and completely dissolved. The solution was spray dried using a vertical pressure spray drier to obtain Invention Product 9. The spray drier used a nozzle SX60-17™ manufactured by Spraying System Co., Ltd., and the spray drier was operated at a spray pressure of 175 kg/cm$^2$, a hot air temperature of 168° C. –176° C., and an exhaust gas temperature of 83° C.

Table 5 shows the amount of casein protein (g) and WPI powder (kg) added, the amount of powder recovered (kg), and the hydrophobicity.

TABLE 5

|  | Invention product 9 |
| --- | --- |
| Na-caseinate (g) | 350 |
| WPI Powder (kg) | 3.5 |
| Recovered powder (kg) | 4.85 |
| Hydrophobicity (FI/mg-protein) | 95 |

The Invention Product 9 obtained in Example 3 was stored for one month and three months at 20° C. Gels were prepared using the Invention Product 9 and a non-denatured whey protein (WPI) (Control Saample), immediately after preparation, one month and three months after the preparation. WPI was dissolved in 166 g of deionized water to a concentration of 15%. Then, 4 g of sodium chloride was added to the solution. This solution was filled into a polyvinyl chloride tube (diameter 3 cm) of which the one end was tied off with a string. After closing another end by tying off with a string, the solution was allowed to stand for 15 minutes, then the tube was placed in a hot water bath at a temperature of 75° C. for 45 minutes to gelatinise the solution. The tube was removed from the hot water bath, cooled in a stream of water for 30 minutes, and allowed to stand at 5° C. overnight, followed by measurement of the gel strength. The gel strength was measured in the same manner as in the Test Example 1 using a Creep-Meter RE-33005™ (a product of Yamaden Co., Ltd.).

The water dissociation was determined by preparing a gel in the same manner as in the measurement of the gel strength, placing the gel with a diameter of 3 cm and a length of 3 cm on a filter paper with a diameter of 12.5 cm (No. 50 Whatman™), and measuring the area [(length of the long axis)×(length of the short axis)] of filter paper into which water was absorbed in 10 minutes by approximation.

Table 6 shows changes in the gel strength and the water dissociation, measured immediately after preparation, and one month and three months after the preparation.

TABLE 6

|  | Invention Product 9 | Control Sample |
| --- | --- | --- |
| Gel strength (g/cm$^2$) |  |  |
| Immediately after preparation | 4720 | 4880 |
| After one month | 4680 | 4530 |
| After three months | 4700 | 4570 |
| Water dissociation (cm$^2$) |  |  |
| Immediately after preparation | 24.4 | 50.3 |
| After one month | 25.8 | 48.8 |
| After three months | 26.0 | 48.0 |

Both the Invention Product 9 and the Control Sample showed approximately the same gel strength immediately after preparation. After one month and three month storage, the gel strength of the Invention Product 9 was maintained at almost the same level as that immediately after preparation without any decrease. The gel obtained was smooth and elastic as compared with the gel obtained from the Control Sample. In addition, the powder of the Invention Product 9 exhibited superior solubility.

The Invention Product 9 showed a low water dissociation after storage for one month or longer. The water dissociation of the Invention Product 9 was excellent as compared with the Control Sample.

The processed whey protein prepared by the present invention exhibits an improved shelf life without change in the viscosity both during storage and after long term storage. In addition, the gel which is obtained from the processed whey protein solution or powder exhibits improved water retention capacity and elasticity, and has a smooth constitution.

What is claimed is:

1. A process for preparing a composition comprising partially heat-denatured whey protein and casein protein, the process comprising the steps of:

a) preparing an aqueous solution of a non-denatured whey protein comprising greater than 5%, but not more than 15% by weight, wherein the pH of said non-denatured whey protein solution is adjusted to 6.8–8.0;

b) heating the solution of step a) at 55 to 120° C. to obtain an aqueous solution of partially heat-denatured whey protein;

c) providing a casein protein in the amount of 0.001 to 0.2 part by weight for 1 part of weight of said whey protein; and d) combining said partially heat-denatured whey protein and casein protein to obtain a hydrophobicity of 50 FI/mg-protein or greater.

2. The process of claim 1 wherein the heating step b) lasts from 1 to 120 minutes.

3. The process of claim 1 further comprising step e) wherein the composition is converted to a powder.

4. The process of claim 1 wherein the casein protein to be provided is at least a protein selected from the group consisting of acid casein, rennet casein, sodium caseinate, potassium caseinate, magnesium caseinate, and decomposition products of these caseins.

5. The process of claim 1 further comprising the step of combining the prepared composition of step d) with a salt to obtain a composition having a shelf life greater than a shelf life of whey protein in solution.

* * * * *